Jan. 29, 1963  G. PHILIBERT  3,075,642
PROCESS AND APPARATUS FOR SORTING BALLS
Filed Dec. 11, 1959  5 Sheets-Sheet 1

INVENTOR
GEORGES PHILIBERT
BY
ATTORNEY

INVENTOR
GEORGES PHILIBERT

Jan. 29, 1963  G. PHILIBERT  3,075,642
PROCESS AND APPARATUS FOR SORTING BALLS
Filed Dec. 11, 1959  5 Sheets-Sheet 3.
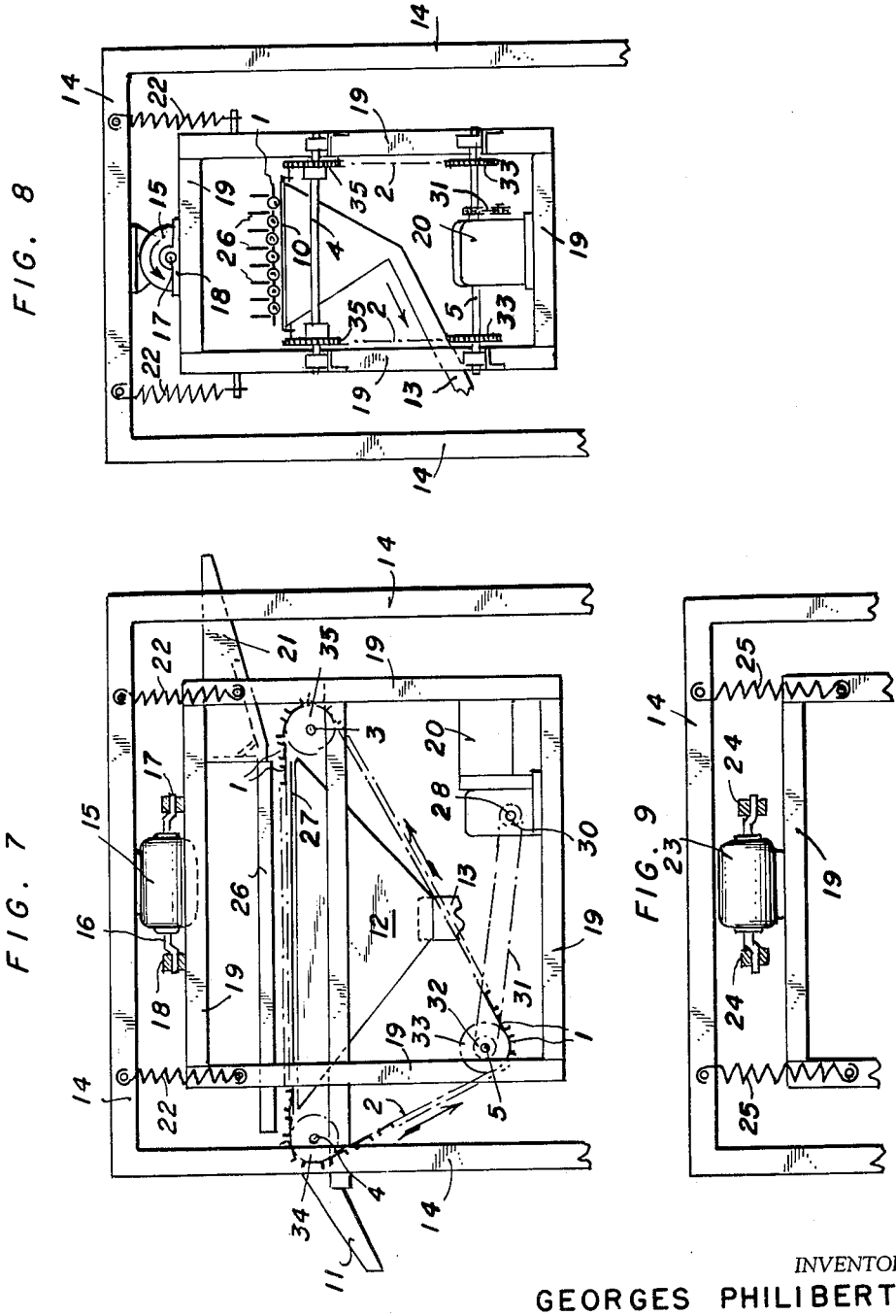
INVENTOR
GEORGES PHILIBERT
BY *Albert L. Frey*
ATTORNEY Jan. 29, 1963    G. PHILIBERT    3,075,642
PROCESS AND APPARATUS FOR SORTING BALLS
Filed Dec. 11, 1959    5 Sheets-Sheet 4

INVENTOR
GEORGES PHILIBERT
BY
ATTORNEY

Jan. 29, 1963
G. PHILIBERT
3,075,642
PROCESS AND APPARATUS FOR SORTING BALLS
Filed Dec. 11, 1959
5 Sheets-Sheet 5
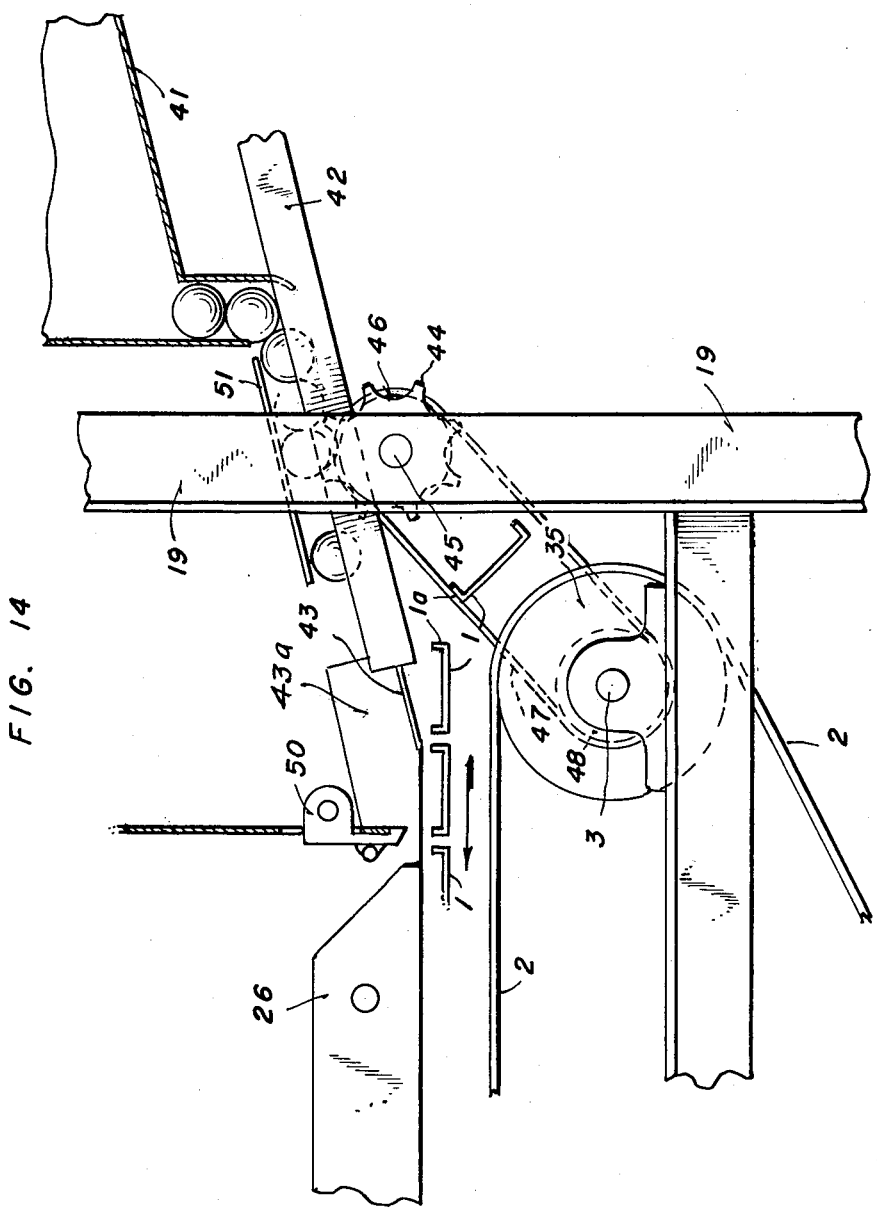
INVENTOR.
GEORGES PHILIBERT
BY
ATTORNEY United States Patent Office 3,075,642
Patented Jan. 29, 1963

3,075,642
PROCESS AND APPARATUS FOR SORTING BALLS
Georges Philibert, Les Gorges Voiron, France, assignor to Compagnie de Saint-Gobain, Paris, France, a company of France
Filed Dec. 11, 1959, Ser. No. 858,951
Claims priority, application France Dec. 16, 1958
22 Claims. (Cl. 209—84)

The present invention contemplates the automatic sorting of spherical bodies such as balls with the purpose of eliminating balls which have various defects.

It applies particularly to the automatic sorting of balls of glass or similar thermoplastic materials and more especially glass balls or marbles designed for the manufacture of glass fibers.

It is known that, for the manufacture of glass fibers, crucibles of a refractory metal, such as platinum or alloys thereof or chambers lined with such metals are provided with orifices across and through which passes the molten glass which is drawn out mechanically to form fibers. These crucibles or chambers are supplied by means of glass balls or marbles which are melted to the desired temperature. The supply of balls requires a regular arrival of the balls. This regular arrival conditions the operation of the draw plate as well as the quality of the manufactured product. Since the supplying of the balls or marbles is accomplished by gravity, no jamming of the balls should occur, whence the necessity of admitting in the crucibles only balls with satisfactory sphericity and regular diameter.

It is known that in the course of the manufacture of glass balls, certain ones present various faults, notably excrescences, hollows, flattened or slightly ovalized surfaces. On the other hand, considerable differences in diameter can likewise be observed.

At present, in order to eliminate defective balls, manual sorting is used. Such a procedure entails serious drawbacks. In fact, manual sorting requires constant visual tension and in consequence rapid fatigue of the operators, the time allowed for observing defects being very brief. In addition, manual sorting remains dependent upon the variable capabilities of the operators, and their personal faculties of estimating.

The invention has for an object the elimination of these drawbacks by making the sorting of balls completely automatic. This sorting, which can take place starting from the manufacture of the balls, or after their stocking, allows either total discontinuance of manual sorting or realization of a first sorting permitting restoration of manual sorting for a small proportion of the balls.

The process according to the invention consists in guiding the balls to be sorted into openings and between projections or points which are spaced apart a distance slightly less than the normal or acceptable diameter of the balls and thereafter causing the balls to turn so as to come successively, according to a great number of their diameters, between said projections or points in such a way that those which have defects in sphericity or suitable roundness will no longer be retained by the projections or points, but will be separated from the others and removed as unacceptable.

According to one form of realization of a device for putting the process in operation, the balls are guided separately into openings each provided with two projections or points opposite each other and between which the balls are kept in motion by rotation thereof in many directions. The openings and the oppositely disposed points are formed in movable numbers or slats which travel continuously at a uniform speed during the grading or sorting operation.

According to another characteristic of the invention the balls are kept in motion inside their openings by rotation movements on themselves which are started by a movement of vibration of the slats containing the openings in both a transverse and vertical direction at the same time. The vertical vibration causes unseating of the ball in the opening while the transverse vibration facilitates rotation of the ball.

It has been established that very satisfactory results were obtained when a line (not shown) joining the center of the extremities of the two points or projections made an angle of about 20° with the direction of the transverse vibrations.

It must be observed in this respect that with such vibratory movements the line (not shown) joining the two points or projections must be neither in the direction of the transverse movement nor in a direction perpendicular to it. In fact, if the line (not shown) joining the two points coincides perceptibly with the direction of transverse motion, the ball tends to roll on itself presenting the same circumference constantly facing the line of points. Also, if the line joining the two points is perpendicular to the direction of the vibration, the two projections or points serve as centers of rotation for the ball which is no longer touched except on smaller or weak diametrically opposed zones.

Hereinafter are described, simply by way of non-limitating examples, forms of realization of devices according to the invention. In this description reference is made to the accompanying drawings which show:

FIG. 7 is a schematic side elevation of a device according to the invention with its system of producing vibrations.

FIG. 8 is a schematic end view of the device of FIG. 7.

FIG. 9 is a partial elevation of a modified form of means for producing vibrations.

FIG. 14 is a schematic side view of a modified form of mechanism for delivering the balls to the sorting mechanism.

Figure 1:
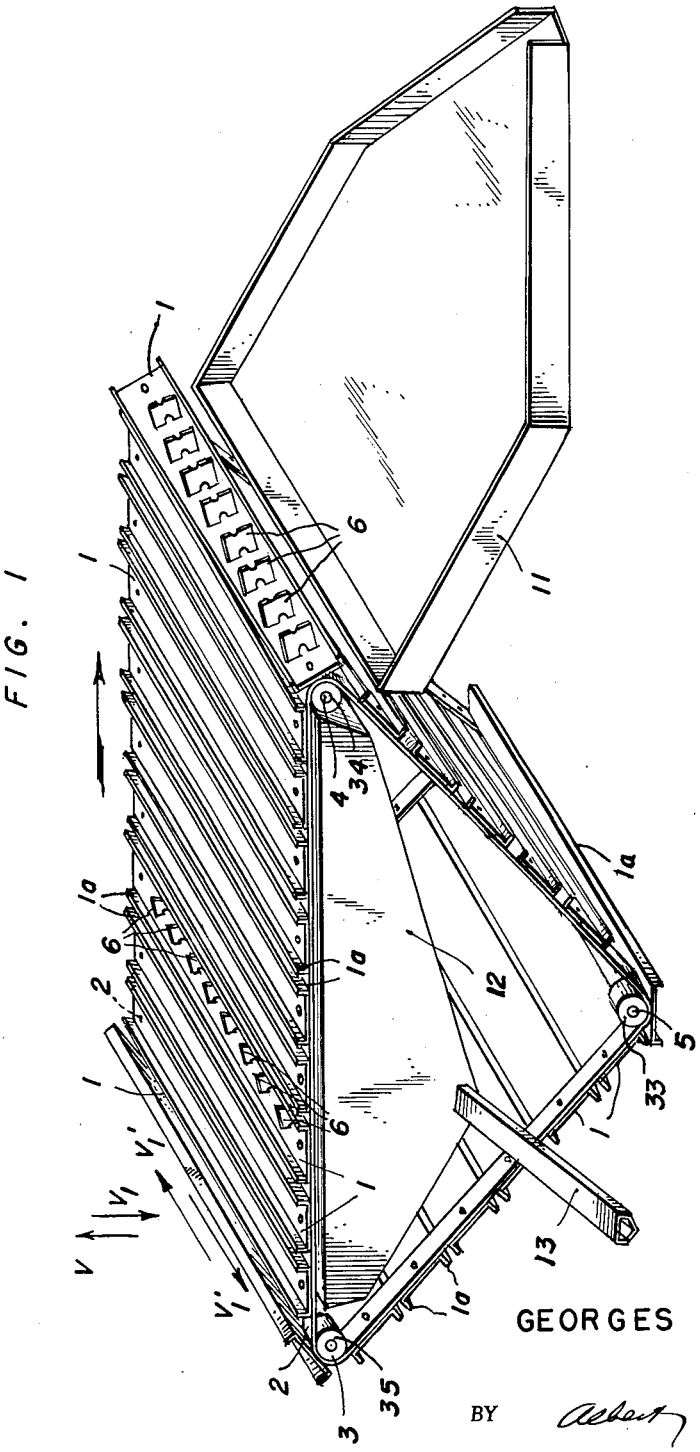
FIG. 1 is a schematic perspective of the continuously traveling plates or slats and the hoppers which receive the rejected and accepted balls.

In the form of realization represented, the device, preferably provided with upstanding flanges 1a as shown in FIGS. 7 and 10 to 13, includes a certain number of movable members or slats 1 mounted parallel to one another on endless flexible longitudinal bands 2 passing over pulleys on shafts 3—4 and drive shaft 5. These plates or slats 1 thus form an endless chain activated by a continuous movement of longitudinal translation, one part of this movement taking place in a horizontal plane between shafts 3 and 4. The speed of translation and length of this chain is such that each plate or slat 1 remains in horizontal position during the time necessary to effect the sorting.

Figure 2:
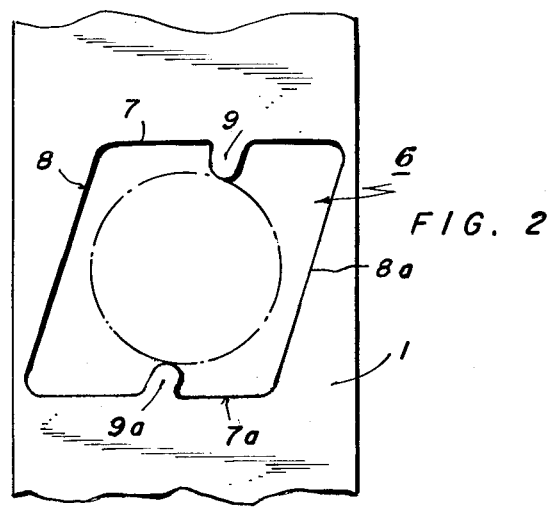
FIG. 2 is a plan detailed view of an opening with its projections or points.

In each slat 1 a series of identical rhomboidal openings 6 are provided, as shown in FIG. 1. FIG. 2 shows in detail the form of one of these openings. The side walls 7—7a of these openings are parallel in the direction of longitudinal travel of the slats 1 while the side walls 8—8a are inclined with respect to the lengthwise edges of the slats, that is, with respect to the direction perpendicular to the longitudinal travel of the slats. Adjacent the side walls 7—7a are provided projections 9—9a, these projections extending inwardly and are placed relatively at the middle of each of these side walls as shown in FIG. 2. A straight line (not shown) which joins their summits is then parallel to side walls 8—8a of the opening 6. In the device represented, it was found advantageous to give this straight line an angle of around 20° with respect to the longitudinal sides of the slat. The distance between the ends or summits of projections 9—9a is slightly less than the diameter of the balls to be sorted. If the mean diameter of the balls is 20 mm., this distance is 19 mm., this diameter being given only by way of example, since it can be selected as function of the strictness of sorting. For this sorting there intervenes moreover in addition the distance between sides 8—8a of the opening 6, which should be such as to aid in the support of balls of the desired size and roundness and at the same time release balls which may be undersized or imperfect.

The endless chain formed by the slats or plates 1 being carried along in the direction of the arrow and being subjected to vertical vibrations, see arrows V—V1 and transverse vibrations $V^1$—$V_1^1$, FIG. 1, the balls to be sorted are conducted by a suitable distributing divice to each of the openings 6 in the slats 1 in the manner hereinafter described.

By reason of the vertical and transverse vibrations to which the slats or plates 1 are subjected, the calibrated openings 6 for the balls undergo at each instant a displacement to either left to right or right to left and a displacement from top to bottom or bottom to top. Under the effect of the vertical vibrations, each ball is projected upward a short distance free of its opening 6 and projections 9, 9a. In falling back vertically, it again is in contact with a single point or projection since, during the time the ball was in the air, the slat and its opening 6 was undergoing longitudinal travel. The ball therefore tilts to resume a position of equilibrium between the two projections 9, 9a by making a part of a turn or rotation on itself.

Immediately afterward, the cycle is reproduced, the ball is tossed upward again, falls on a projection and tilts again, turning each time a part of a turn on itself.

As a result of the action of these vibrations, the entire surface of the ball is touched by the projections or points 9, 9a.

Figure 3:
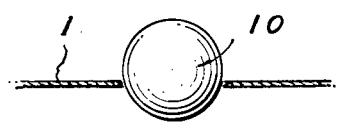
FIGS. 3 and 4 are a vertical section and plan view, respectively, of a perfectly spherical ball in its opening.
Figure 4:
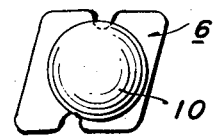

The balls that present suitable roundness remain in their opening (see ball 10, FIGS. 3 and 4) and are conducted by the slats or plates 1 up to the moment of turning of the slats 1 about the axis of the shaft 4 whereupon the balls are discharged and are collected and removed from the machine by the inclined chute 11.

Figure 5:
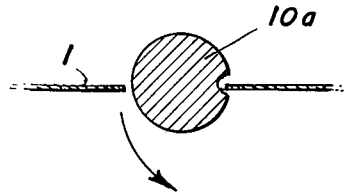
FIGS. 5 and 6 are a vertical section and plan view, respectively, of a ball with a channel or imperfection therein at the moment it leaves its opening under rejection.
Figure 6:
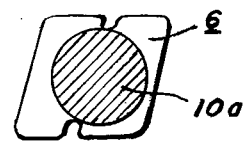

When the balls present defects of roundness, for example ball 10a, FIGS. 5 and 6, a moment arrives when their less than normal or desired diameter comes between the projections 9, 9a. At this moment they turn and fall from their opening. They are thus eliminated and gathered in a hopper 12 to be evacuated through passage 13.

Various means can be utilized to obtain the vibrations necessary to communicate to the balls the required movement of rotation in order that their entire surfaces are touched by the projections or points 9, 9a.

In the form of realization represented by way of example in FIGS. 7 and 8, the apparatus for sorting the balls comprises a rigid framework 14 to which a motor 15 is attached. Shaft 16 of this motor is bent to form cranks 17 at its opposite ends. These two cranks are engaged in bearings 18 integral with a floating or movable rectangular frame 19 supporting the chain of slats 1.

The frame 19 supports a motor with the reducer 20 provided with an outwardly extending shaft 28. This shaft carries a pulley 30 over which passes a belt 31. The opposite end of the belt passes over a pulley 32, the latter being fast to the shaft 5 which extends transversely across and mounted in bearings on frame 19. The shaft 5 adjacent its opposite ends carries pulleys 33 over which pass the bands or belts 2 of the endless chain of slats 1.

The bands 2 extend upwardly and pass over pulleys 34 fixed adjacent the opposite ends of the transverse shaft 4, the latter being carried in suitable bearings on the frame 19. The bands 2 carrying the slats 1 then extend in a horizontal direction, passing over the pulleys 35 fixedly connected to the opposite ends of the shaft 3, the latter extending transversely across the machine and mounted in bearings (not shown) on the frame 19. The bands 2 with their slats 1 then are inclined downwardly and pass over the pulleys 33, before described, thus completing the circuit of the endless bands 2 and slats 1 affixed thereto. Sprockets and chains may be substituted for the pulleys and belts above described, if desired.

The endless chain of slats travels continuously at a predetermined and uniform speed, the horizontal flight thereof in the direction of the arrow shown in FIG. 7.

The movable frame 19 also supports the ramp or hopper 21 for distributing the balls to the slats 1 and the hopper 12 for collecting and carrying away the rejected balls. The hopper or ramp 11, which receives the accepted balls, is suitably affixed to the stationary frame 14.

Springs 22, see FIGS. 7 and 8, have their upper ends attached to the stationary frame 14 and their lower ends attached to the movable frame 19, thus compensating for the weight of the movable frame 19 and parts carried thereby while assuring the proper functioning of the motor 15.

As motor 15 turns, it communicates to frame 19, by means of the extremities of its shaft in the shape of cranks, movements alternately in vertical and transverse directions. By reason of the relatively high speed of the motor, for example 1400 r.p.m., these movements are translated by vibrations such as V—$V_1$ and $V^1$—$V_1^1$, as shown and indicated by the arrows in FIG. 1.

In the form of realization represented in FIG. 9, the vibrations of the frame 19 are obtained by means of a motor 23 affixed thereto whose shaft is weighted, that is, it carries eccentric masses 24 at its two extremities. Frame 19 is then suspended from the framework 14 by means of springs 25 in the same manner as shown in FIGS. 7 and 8. In turning, the weight due to masses 24 induces vibrations identical to those obtained by the crank arrangement shown in FIGS. 7 and 8.

This method of obtaining the vibrations presents important advantages with respect to that shown in FIGS. 7 and 8. In this way no vibration is transmitted to the framework 14 and this framework can then consist of a tubular mounting simply resting on the ground. Friction due to the cranks in their shafts is suppressed, hence causes of wear are suppressed and consequently there is a minimum of upkeep and operation is silent.

The desired vibrations can likewise be obtained by utilizing two magnetic vibrators. In this case, frame 19 is mounted in the same way as in the preceding example and the vibrators are located 90° apart.

Automatic means are also provided for feeding or delivering the manufactured balls or marbles by gravity to the openings 6 and projections 9, 9a formed in the slats 1 just after their entry into the line of horizontal travel as shown in FIG. 7.

The ball feeding mechanism is shown in FIG. 7 and schematically shown in FIGS. 10 to 13, inclusive. In the latter figures the lower end of the ramp or hopper 21 is shown and is provided with a downwardly extending vertical flange 21a. Beyond and above the lower end of the ramp 21 is a guide element 36 which extends transversely across the machine and is suitably supported in the frame 19. The location of this guide element is just behind the point where the slats 1 begin their line of horizontal travel as shown in FIG. 7. The guide element 36 consists of a vertical leg 37 terminating in the lower edge 38 and an angular portion 40. This angular portion 40 serves as a baffle or guard against any balls rising above the normal plane of delivery in which event they might clog the normal feeding of the balls by gravity to the openings and projections in the slats 1.

Figure 10:
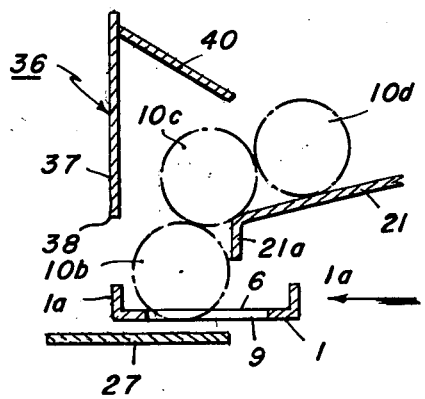
FIGS. 10 to 13 are detailed views in section showing the distribution or feeding of the balls to the openings in the slats.

In FIG. 10 the leading ball 10b from the hopper 21 is shown entering, under the influence of gravity, one of the openings 6 in the slat 1. It should be recalled here that the slats 1 are continuously moving in a horizontal direction, as indicated by the arrow, at a uniform speed. The balls 10c and 10d follow the ball 10b.

Figure 11:
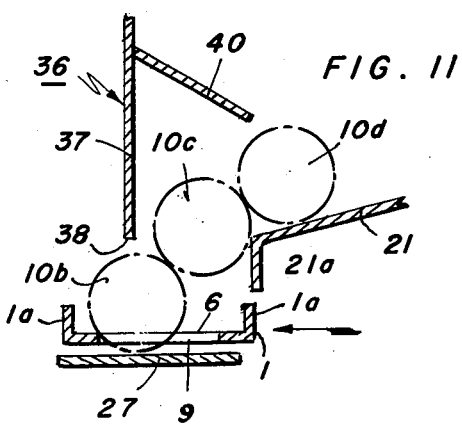

In FIG. 11 the ball 10b is about to be seated in the opening 6 of the slat 1, the latter having moved toward the left. The ball 10c is resting against the ball 10b and the upper edge of the flange 21a. In this figure the ball 10b may rest temporarily on the horizontal supporting plate 27 which extends transversely of the machine and is supported by the movable frame 19.

Figure 12:
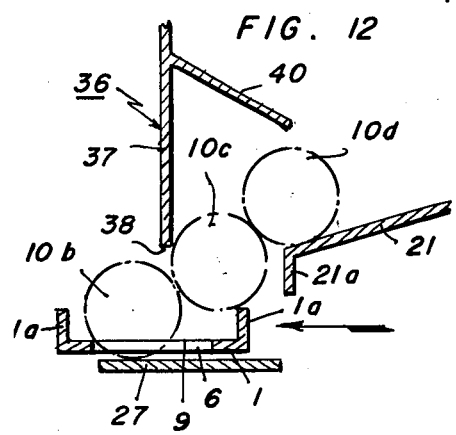

In FIG. 12 the slat 1 has been moved further to the left with the ball 10b seated in the opening 6 of the slat 1. The ball 10c is being retained momentarily by the lower edge 38 of the vertical part 37 and the upper edge of the right-hand flange 1a. The following ball 10d is awaiting its turn for delivery to the opening 6 in a succeeding slat 1.

Figure 13:
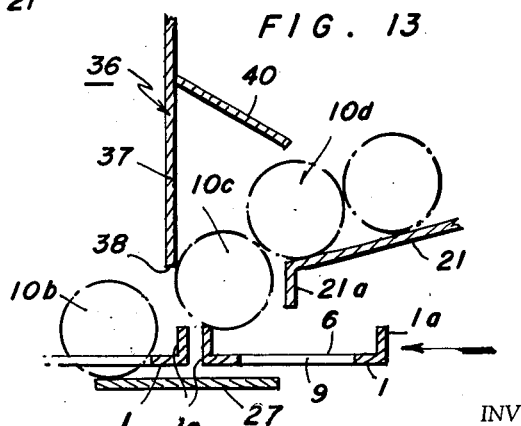

In FIG. 13 the ball 10b has traveled to the left by virtue of the movement of the slat toward the left and the ball 10c is momentarily resting between the upper edge of the left-hand flange 1a of the succeeding slat and against the ball 10d. It is restrained from moving to the left by the edge 38 of the vertical leg 37. Further movement of the right-hand slat 1 in FIG. 13 will permit the ball 10c to drop into the opening 6 of the succeeding slat 1 in a manner like that shown in FIG. 10, thus completing the cycle.

The balls traveling down the ramp 21 should be spaced apart transversely, before delivery to the sorting mechanism, to an extent equal to the spacing of the openings 6 in the slats 1. For this purpose the ramp 21 may be provided with guide members separating the balls from one another.

Instead of the feeding device shown in FIGS. 7 and 10 to 13, a feeding device such as shown in FIG. 14 may be employed. Here a hopper 41 for the balls is in communication with an inclined chute 42 which is inclined downwardly and terminates at the point of loading the individual slats 1 of the sorting mechanism. The inclined chute 42 is provided with an extension 43 along which the balls proceed toward the sorting mechanism. The chute 42 and its extension 43 extend transversely across the feeding device a distance substantially equal to the length of the slats 1.

The chute 42 is provided with a plurality of guide members extending lengthwise of the chute and spaced apart so as to provide trackways for the balls traveling down the chute. The trackways, each of which is formed by a pair of adjacent guide members, are in alignment with the openings 6 in the slats 1. Likewise, the vertical partitions 43a, which form continuations of the guide members in the chute 42, serve to guide the balls into the openings 6 in the slats 1.

A series of transversely spaced pocketed wheels 44 extend upwardly into the trackways or guideways for the balls. The pockets in the spaced wheels engage the balls as they travel downwardly along the trackways and impart to the balls a positive movement or feed toward the loading point of the sorting mechanism. The spaced pocketed wheels are fast to a shaft 45 suitably mounted in bearings fixed to the frame 19. Fast to the shaft 45 is a pulley 46. Passing over the pulley 46 is a belt 47, the opposite end of the belt passing over a pulley 48, the latter being fast to the shaft 3 of the sorting mechanism.

The speed of rotation of the spaced pocketed wheels 44 should be such that the transverse rows of balls reach the end of the extension 43 and are delivered to the openings 6 in the slats 1 when such openings are in suitable alignment with the delivery end of the extension 43.

An adjustable guide member 50 is provided as an aid in the delivery of the balls to the openings 6 in each of the slats 1.

A pressure plate 51 is arranged above the balls and contacts lightly therewith to maintain the balls in contact with the pocketed wheels 44 in opposition to any lifting movement exerted by such wheels and the vibrations of the movable frame 19.

All of the parts above described in connection with FIG. 14 are suitably supported by the movable frame 19.

It will be understood from the foregoing that the balls are fed to the series of openings in each slat simultaneously and in the same manner as described above in connection with FIGS. 10 to 14.

The longitudinal flanges 1a of the slats 1 permit an easy distribution of the balls at the rate of one ball per opening 6 and prevent the balls from shifting from one slat toward or upon another slat under the effect of the vibrations imparted to the movable frame 19.

In a somewhat similar manner longitudinal partitions 26, see FIGS. 7 and 8, suitably carried by the movable frame 19, are arranged so as to occupy a position across the slats and between adjacent balls and beyond the end balls of each row to prevent the balls in any of the openings from shifting toward an adjacent opening in the same slat.

I claim:

1. In apparatus for sorting balls, the combination of a plurality of movable slats arranged in parallel relation, each of said slats being provided with a plurality of similar spaced openings and oppositely disposed projections associated with each of said openings for contact with the balls to be sorted, the distance between said projections being slightly less than the desired diameter of the balls to be sorted, means for delivering balls to be sorted to said openings in each of said slats, means for vibrating said slats so as to turn each ball upon axes corresponding to a large number of diameters of the ball and between said projections whereby balls having defects of sphericity are no longer retained between said projections but pass through said openings to be discarded as unacceptable balls.

2. The apparatus set forth in claim 1 wherein the vibrating means moves the slats in a vertical direction.

3. The apparatus set forth in claim 1 wherein the vibrating means moves the slats in a transverse direction.

4. The apparatus set forth in claim 1 wherein the vibrating means moves the slats vertically and transversely.

5. The apparatus set forth in claim 1 wherein the slats partake of a horizontal movement from the receiving end to the delivery end of the machine at a continuous and uniform speed.

6. The apparatus set forth in claim 5 wherein the spaced openings in the slats are defined in part by oppositely disposed side walls which are substantially parallel to each other and to the direction of horizontal travel of the slats.

7. The apparatus set forth in claim 6 wherein a projection extends inwardly from each of the oppositely disposed side walls and is located substantially midway of the length of said side walls.

8. The apparatus set forth in claim 7 wherein said opposed side walls join other and oppositely disposed side walls, said last-named walls being parallel to each other and arranged at an angle with respect to the lengthwise edges of the slats.

9. The apparatus set forth in claim 7 wherein a line connecting the summits of the projections extends at an angle of the order of 20° with respect to the direction of transverse vibrations of the slats.

10. In apparatus for sorting balls, the combination of a stationary frame, a movable frame supported thereby, a plurality of slats arranged in the form of an endless chain including a horizontal flight portion carried by said movable frame, means for driving said endless chain at a continuous and uniform speed, each of said slats being provided with a plurality of similar spaced openings and oppositely disposed projections associated with said openings, the distance between the summits of said projections being slightly less than the diameter of the acceptable balls, means for delivering balls to be sorted to the openings in each slat and the projections associated therewith after each of the slats enters the horizontal flight portion, and means for vibrating the movable frame and thereby rotate each ball upon several of its diameters in the openings and upon its associated projections, whereby balls of unacceptable diameter will fall through the openings in each slat and acceptable balls are retained in said openings of each slat.

11. The invention set forth in claim 10 wherein the means for vibrating the movable frame consists of a motor fixed to the stationary frame and provided with a shaft, the opposite ends of which are formed into crank arms pivotally mounted in the movable frame.

12. The invention set forth in claim 10 wherein the means for vibrating the movable frame consists of a motor fixed to the movable frame and having a shaft, the opposite ends of which are weighted with eccentric bodies.

13. The invention set forth in claim 10 wherein the openings in the several slats in traveling in a horizontal direction are separated by vertical partitions carried by the movable frame.

14. The invention set forth in claim 10 wherein the slats are U-shaped in transverse cross-section.

15. The invention set forth in claim 1 wherein the means for delivering balls to be sorted to the openings in each of the slats includes an inclined chute down which the balls travel seriatim under the force of gravity to the openings formed in each of the slats following their positioning for travel in a horizontal plane, and means for restraining the downward movement of a succeeding ball until the preceding ball fully occupies the opening in the preceding slat.

16. The invention set forth in claim 15 wherein a series of transversely spaced pocketed wheels are located in the inclined chute whereby the balls are positively fed toward the loading point of the sorting mechanism.

17. An apparatus for the automatic sorting of balls, particularly balls of glass designed to be used in the manufacture of glass fibers, which comprises a support having a plurality of spaced openings with oppositely disposed projections associated with each of said openings for contact with the balls to be sorted, the distance between said projections being slightly less than the acceptable diameter of the balls adapted to be retained on said support, means to conduct individual balls to each of said openings, and means for turning each of said balls about different axes for repeated contact with said projections to gauge different diameters of the balls between said projections so that defective balls pass through said openings as unacceptable.

18. An apparatus as set forth in claim 17 wherein said support is comprised of a plurality of interconnected slats movable along a substantially horizontal plane.

19. An apparatus as set forth in claim 17 wherein said openings in the slats are rhomboidal in shape, and means for moving the slats continuously at a uniform speed.

20. An apparatus as set forth in claim 17 wherein said support is movable in a substantially horizontal direction and the spaced openings in the support are defined in part by oppositely disposed side walls which are substantially parallel to each other and to the direction of horizontal travel of the support.

21. An apparatus as set forth in claim 20 wherein a projection extends inwardly from each of the oppositely disposed side walls and is located substantially midway of the length of said side walls.

22. An apparatus as set forth in claim 18 wherein said spaced openings in the slats are defined by oppositely disposed side walls which are substantially parallel to each other and to the direction of horizontal travel of the support and by other oppositely disposed side walls parallel to each other and arranged at an angle with respect to the longitudinal edges of the slats.

References Cited in the file of this patent

UNITED STATES PATENTS

| | | |
|---|---|---|
| 1,242,034 | Pearson | Oct. 2, 1917 |
| 1,508,835 | Contant | Sept. 16, 1924 |
| 1,812,468 | Brooke | June 30, 1931 |
| 2,238,454 | Steele | Apr. 15, 1941 |
| 2,645,189 | Hansalik | July 14, 1953 |